May 27, 1958 F. H. BUSCH 2,836,795
ADJUSTABLE LAG COMPENSATOR
Filed Dec. 21, 1956
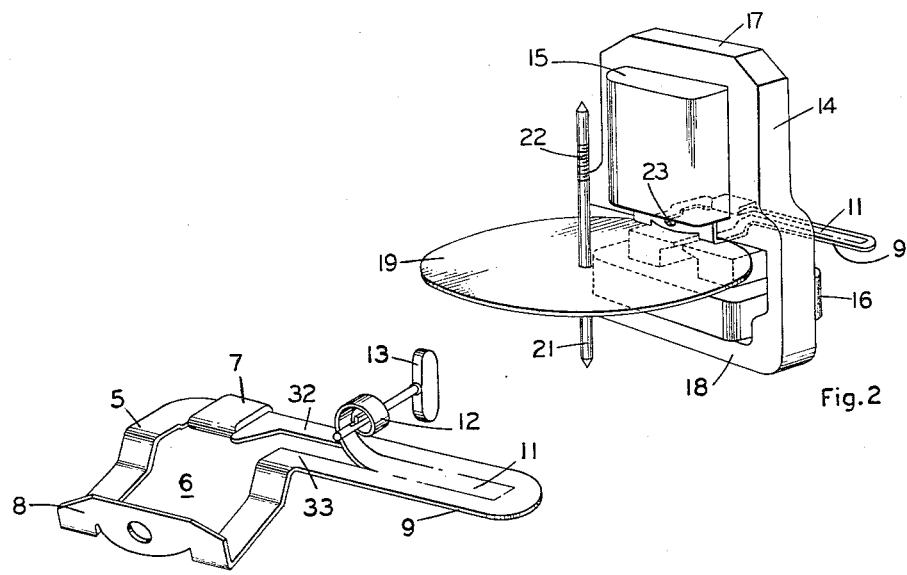
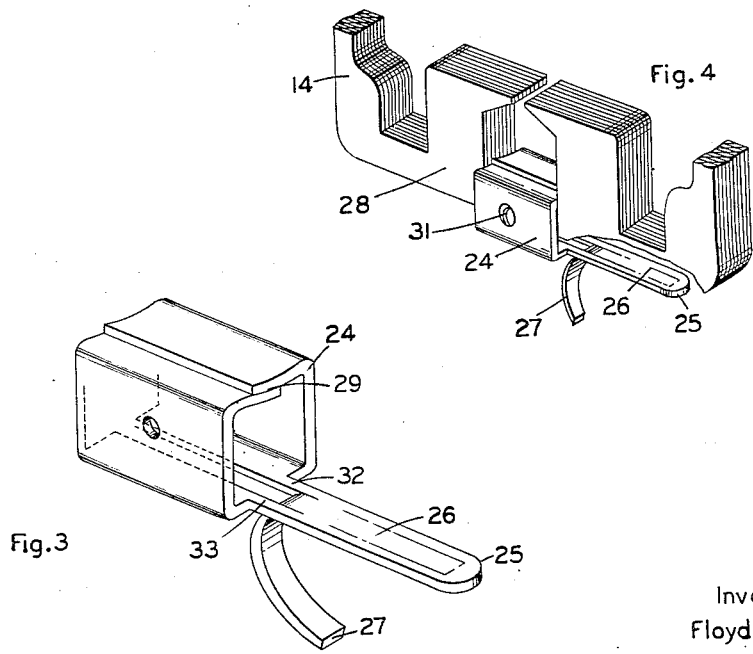
Inventor:
Floyd H. Busch
by Richard E. Hosley
His Attorney United States Patent Office 2,836,795
Patented May 27, 1958

2,836,795

ADJUSTABLE LAG COMPENSATOR

Floyd H. Busch, Rochester, N. H., assignor to General Electric Company, a corporation of New York Application December 21, 1956, Serial No. 629,808

4 Claims. (Cl. 324—138)

This invention relates to an improved adjustable lag compensator for alternating current watthour meters of the induction type and has for its object the provision of a novel means of adjustment which may be readily and easily manipulated by hand to achieve a smooth, gradual adjustment of the compensating action.

Heretofore it has been a common practice in the art of induction watthour meters to provide an adjustable lag compensator in such meters to obtain the proper phase relationship between the voltage and current fluxes. Such compensators have taken the form of short circuited coils linking either the voltage flux or the current flux or both, and such coils have been provided with various adjusting means for changing their resistance to allow for adjustment during manufacture to obtain proper calibration.

An example of one form of such coils is shown in U. S. Patent No. 2,321,437 of H. E. Trekell, assigned to the same assignee to which the subject invention is assigned, and upon reference to this patent, it will be seen that the lag compensator is in the form of a metallic conducting plate having an elongated portion constructed and arranged to permit adjustment of the effective resistance of the plate. In one form of Trekell's arrangement, a step-by-step adjustment is achieved by successive severing of the webs separating his spaced perforations, whereas in the other form of his arrangement, a continuous adjustment is achieved by proper positioning of a shunting member that is slidably mounted on the plate extension.

While either of the aforesaid arrangements is acceptable, both are subject to certain drawbacks—the former being at best a step-by-step adjustment that does not yield optimum calibration and the latter, although yielding a more precise adjustment than the former, presenting a manufacturing problem in that soldering, welding, or other equivalent techniques must be utilized to rigidly fasten the slider in place once proper calibration has been obtained.

The present invention overcomes the aforesaid drawbacks, as well as others associated with other known forms of adjustable lag compensators, in that any adjustment can be readily and easily performed without the use of relatively complex manufacturing techniques, and such adjustment may be smooth and gradual to allow for extremely precise calibration of the watthour meters.

Briefly, the invention comprises a lag compensator in the form of a closed electrically conducting metallic loop that may be fixedly secured to either the voltage or current electromagnets of a conventional watthour meter, being located thereon in a position at which the flux of the associated electromagnet links the loop to induce a current therein. The loop is provided with an elongated portion which forms a part of the path for the induced current, and the elongated portion has formed therein a separable tear strip which may be gradually removed to alter the length of the current path through the elongated portion. The resistance of the loop may be varied in this manner to obtain a smooth calibrating adjustment of an associated watthour meter. A key may be provided for connection to a tab on the tear strip whereby the strip will be easily removed by simple manual manipulation of the key, with the part removed being wound on the key as the adjustment is made.

The objects and advantages of the invention will be apparent upon reference to the drawing annexed hereto, in which:

Figure 1 is a perspective view of one form of lag compensator forming the subject of this invention;

Figure 2 is a perspective view of a part of a conventional watthour meter, illustrating how the lag compensator of Figure 1 may be affixed thereto;

Figure 3 is a perspective view of another form of lag compensator constructed in accordance with this invention; and Figure 4 is a partial perspective view of a portion of a conventional watthour meter core assembly, illustrating how the lag compensator of Figure 3 may be affixed thereto.

Referring now to Figure 1, there is shown a lag compensator in the form of an electrically conducting, metallic plate 5 having an aperture 6 therein to provide a short-circuited loop. The plate 5 carries a compensating magnetic circuit member 7, of the type shown in the aforesaid Trekell patent, and has a portion thereof formed as the mounting flange 8.

Extending outwardly from one corner of plate 5 is the elongated portion 9, which forms a part of the path for any current induced in plate 5, and this elongated portion has formed as an integral part thereof the separable tear strip 11. The tear strip may be located substantially centrally in the portion 9 and extends along the direction of elongation between points adjacent the inner and outer extremities thereof. The inner extremity of tear strip 11 is separated from portion 9 to form a tab 12 which may be readily inserted in the slotted shaft of a key 13.

The tear strip may be formed in the portion 9 by any of the conventional techniques understood by those skilled in the art, one method being to score the surfaces of the portion 9 along a pair of parallel lines, after which the inner extremity of the portion within the scored lines may be separated to form tab 12.

Once the plate 5 has been formed as described above, it may be mounted on a watthour meter, a typical form of the induction mechanism of such meters being shown in Figure 2. Thus, referring to Figure 2, there is shown a magnetic core 14 of conventional design, having mounted thereon a voltage winding 15 and a current winding 16, which form therewith an upper voltage electromagnet 17 and a lower current electromagnet 18. These electromagnets are separated by an air gap in which is arranged to move a conventional induction disc armature 19. Armature 19 is carried by a suitably journalled shaft 21, which in turn has a portion thereof formed as a worm gear 22 which may be coupled through a conventional worm wheel to a suitable registering mechanism, all in a manner well known to those skilled in the art.

As shown in the drawing, the lag compensator 5 is mounted on the voltage electromagnet 17 by means of a screw 23, which passes through the aperture in mounting flange 8 and cooperates with a suitably threaded aperture in the voltage electromagnet. The lag compensator is thus linked by the voltage flux, and the tear strip 11 may be gradually removed as required to obtain proper meter calibration.

Another form of the invention is shown in Figure 3, wherein the lag compensator is in the form of a band 24, formed of a suitable electrically conducting material, having the elongated portion 25 in which is formed a separable tear strip 26. The formation of the tear strip 26 may be as in the arrangement of Figure 1, and it has a tab 27, similar to the tab 12, which may cooperate with a key similar to key 13 for purposes of adjustment.

Upon reference to Figure 4, it will be seen how the band 24 may be affixed to an induction watthour meter. Such watthour meter may be identical to that shown in Figure 2 and, for convenience, only a portion of the mechanism shown in Figure 2 has been shown in Figure 4. Thus, and using like numbers to identify like parts, a portion of the core 14 is shown, with the current winding removed, revealing the core structure 28 of the current electromagnet 18, to a portion of which may be affixed the band 24. In the assembly of these parts, the band 24 may be initially open, after which it may be wrapped around the core structure 28 and then soldered to form the joint 29. A screw 31 may be used to further secure the band in place, after which the tab 27 may be manipulated as desired to obtain proper calibration.

With both forms of the invention, initial separation of the tear strip required to form the tabs 12 or 27, divides the inner extremity of the elongated portions 9, 25 into a pair of parallel conducting paths 32, 33 which with a portion of the unseparated tear strip, comprises a portion of the path for the flow of induced current. As the tear strip is separated, these parallel conducting paths gradually become longer to gradually increase the length of the conducting loops to thereby gradually increase their effective resistance. The gradual adjustment of resistance provides the necessary calibrating adjustment, and with either form of the invention, the separated part of the tear strip, along with the adjusting keys, may be completely severed by cutting it away from the part remaining. After permanent severance of most of the separated tear strip, a small tab will still remain, but no further separation will occur during use.

Therefore, while particular embodiments of the subject invention have been shown and described herein, these are in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. In an electric watthour meter of the induction type having a rotatably mounted disc armature, a voltage electromagnet, and a current electromagnet, a lag compensator therefor, comprising: a closed electrically conducting metallic loop fixedly secured to one of said electromagnets and located thereon in a position at which the flux of the electromagnet links said loop to induce a current therein, said loop having an elongated portion which is adjustably to vary the effective length of the loop to thereby vary its resistance, said elongated portion being formed initially with a separable tear strip integral therewith, said tear strip being located substantially centrally in said elongated portion and extending along its direction of elongation between points adjacent the inner and outer extremities of said portion, said tear strip having its inner extremity in the form of a tab separated from said elongated portion, said separated tab dividing said portion into a pair of parallel conducting edge portions which with a portion of the unseparated tear strip forms the path for said induced current to flow through said elongated portion, said path becoming gradually longer as said tear strip is gradually separated from said portion.

2. In an electric watthour meter of the induction type having a rotatably mounted disc armature, a voltage electromagnet, and a current electromagnet, a lag compensator therefor, comprising: a closed electrically conducting metallic loop fixedly secured to one of said electromagnets and located thereon in a position at which the flux of the electromagnet links said loop to induce a current therein, said loop having an elongated portion which is adjustable to vary the effective length of the loop to thereby vary its resistance, said elongated portion being in the form of a substantially U-shaped member initially formed with a separable tear strip integral therewith, said tear strip bridging the space between the legs of said U-shaped member and initially extending from points adjacent the outer and inner extremities of said U-shaped member, said induced current flowing along said legs and across an unseparated portion of said tear strip in its passage around said loop, said path of said current becoming gradually longer along said legs as said tear strip is gradually separated, said tear strip having its inner extremity in the form of a tab which may be used to facilitate separation of said tear strip.

3. The combination defined by claim 2 wherein said loop is in the form of a substantially flat quadrangular loop, said loop being secured to said voltage electromagnet proximate to the pole face thereof.

4. The combination defined by claim 2 wherein said loop is in the form of a band, said band being secured to said current electromagnet so as to surround the core thereof.

References Cited in the file of this patent

UNITED STATES PATENTS

| 2,321,437 | Trekell | June 8, 1943 |

FOREIGN PATENTS

| 524,061 | Great Britain | July 29, 1940 |